US008572103B2

(12) United States Patent
Werner

(10) Patent No.: US 8,572,103 B2
(45) Date of Patent: Oct. 29, 2013

(54) METHOD AND SYSTEM FOR BENCHMARKING RFID DATA AGAINST SLA DATA

(75) Inventor: Kerstin Werner, Walldorf (DE)

(73) Assignee: SAP AG, Walldorf (DE)

( * ) Notice: Subject to any disclaimer, the term of this patent is extended or adjusted under 35 U.S.C. 154(b) by 984 days.

(21) Appl. No.: 12/239,858

(22) Filed: Sep. 29, 2008

(65) Prior Publication Data

US 2010/0082578 A1 Apr. 1, 2010

(51) Int. Cl.
*G06F 17/30* (2006.01)

(52) U.S. Cl.
USPC .................................... 707/756; 707/999.003

(58) Field of Classification Search
None
See application file for complete search history.

(56) References Cited

U.S. PATENT DOCUMENTS

2006/0091207 A1* 5/2006 Chang .......................... 235/385
2009/0271468 A1* 10/2009 DiStefano ..................... 709/201

* cited by examiner

*Primary Examiner* — Anteneh Girma

(57) ABSTRACT

A system and method to capture and analyze data from an EPCIS repository and an SLA repository is described. The data is captured from both repositories according to pre-defined criteria. The data from the EPCIS repository is mapped to the data form the SLA repository. Further, the data is combined into a unified format to represent meaningful benchmarking data to stakeholders in a supply chain.

17 Claims, 4 Drawing Sheets

METHOD AND SYSTEM FOR BENCHMARKING RFID DATA AGAINST SLA DATA

FIELD OF THE INVENTION

The invention relates generally to exchanging information between participants in a supply chain, and, more specifically, to producing meaningful benchmark data from radio frequency identification data and service level agreement data.

BACKGROUND OF THE INVENTION

A supply chain (also referred to as "logistics network") is a system of organizations, people, technology, activities, information, and resources involved in moving a product or service from supplier to customer. Supply chain activities transform natural resources, raw materials, and components into a finished product that is delivered to the end customer. Within a supply chain, there are many participants involved before a finished product is delivered to an end customer. For example, a finished product requires raw materials from one or more suppliers, then the raw materials are supplied to parts manufacturers, the parts manufacturers supply the parts to the manufacturer of the product, and the manufacturer assembles the parts (components) to produce a finished product. Between each stage, there are logistics involved to transport the items from one supplier to another, and, finally the finished product to the end customer. Thus, the participants (alternatively, "stakeholders") in the supply chain are diverse organizations that fall into one of the following categories: materials supplier, parts manufacturer, product manufacturer, logistic provider (e.g. "carrier"), end customer. When a customer places an order for a product, the manufacturer of the product agrees to supply the product within a set of requirements. For example, the manufacturer agrees to supply the product of an expected quality, within an expected time frame, at a specified location, and so on. These requirements are listed in an agreement between the manufacturer and an end customer and the manufacturer must conform to the requirements or pay for incurred damages and potential losses. Each time there is a transfer of a good or service between a service provider and a service recipient, there are many formally negotiated conditions that are placed in a contract signed by the two involved parties. Such contracts are referred to as "Service Level Agreements" (SLA). An SLA represents the common understanding of the two parties about services, priorities, responsibilities, guarantee, and so on. All of these are collectively referred to as "level of service". For example, an SLA may specify the levels of availability, serviceability, performance, operation, or other attributes of the service like billing and even penalties in the case of violation of the SLA. For a good or service to advance from one stakeholder to another stakeholder in the supply chain, there is an SLA in place specifying the agreed level of service between the two stakeholders. For each stakeholder to perform to the expected level of service specified in the SLA, stakeholders must precisely track the movement of goods and services throughout the supply chain. Supply chains utilize sophisticated technologies to track goods and services and exchange tracking information between stakeholders in the supply chain. An example of such a technology is Radio Frequency Identification (RFID). RFID is a technology that identifies objects using radio waves. To identify an object, an RFID tag is placed on the object. The RFID tag contains an Electronic Product Code (EPC) that identifies the object uniquely. To track the object using the RFID tag, organizations use special readers that can read radio signals representing the EPC. In conjunction with a database, the EPC is used to retrieve further information about the tagged object, such as the brand, size, origin, date of manufacture, and so on. In order for all stakeholders in a supply chain to exchange information pertaining to a good (i.e. object) in a uniform manner using the EPC, there is an internationally recognized standard called Electronic Product Services Information Services (EPCIS). Stakeholders in a supply chain use EPCIS repositories to maintain information about goods and services moving through the supply chain. Because an EPCIS repository tracks information about goods moving through a supply chain, information is recorded in the EPCIS repository based on the occurrence of events. An EPCIS repository can maintain four event types: object event, aggregation event, quantity event, and aggregation event. Further, each event type has a number of attributes that provide information across four dimensions: what, when, where, and why. To record "what", the EPCIS provides attributes such as "object-EPC", "EPC list", "transaction list", "EPC class", "quantity", and "transaction list". To record "when", the EPCIS provides the "time" attribute. To record "where", the EPCIS provides attributes such as "location-read point" and "business location". To record "why", the EPCIS provides attributes such as "business context—process" and "arrangement". The EPCIS repository also includes the relevant interfaces so that stakeholders can extract and exchange the information maintained in the EPCIS repository. Upon the occurrence of an event in the supply chain, the event is classified as one of the four event types and information about it is recorded in the EPCIS repository. Thus, using RFID and an EPCIS repository, the transparency in a complex supply chain is increased and stakeholders in the chain can provide a higher level of service. Also, to provide a higher level of service, there is a need for stakeholders to measure their compliance to negotiated SLAs. For an objective measurement, RFID data may be used to measure the compliance to an SLA.

SUMMARY OF THE INVENTION

A method and system to collect, analyze, and exchange benchmark data for supply chains is described. Data is collected from service level agreements (SLA) and electronic product code information services (EPCIS) databases. Further, data from EPCIS databases is mapped to the data from the SLA and analyzed for compliancy. The analyzed data is translated into native XML format to produce a comprehensive package of benchmark data and the benchmark data is exchanged between participants in a supply chain over a network.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

A system and method to extract and transform data form an Electronic Product Code Information Services (EPCIS) repository and a Service Level Agreement (SLA) repository into meaningful benchmarking data in a supply chain is described. Meaningful benchmarking data in a supply chain is data which helps to measure if a stakeholder in a supply chain provides a level of service as specified in an SLA. Thus, to obtain benchmarking data, an embodiment of the invention uses a method to map data from the EPCIS repository to data from the SLA repository. Further, the embodiment of the invention analyzes if the EPCIS data complies with the SLA data. If the EPCIS data complies with the requirements of the SLA data, it can be estimated that the stakeholder in the supply chain performs according to the level of service required by the SLA. Also, it may be necessary to exchange the benchmarking data across the supply chain so that two or more stakeholders can exchange data about their performance and improve the performance of the whole supply chain, if necessary. To exchange benchmarking data embodiments of the invention use web services and aggregate security data on top of benchmarking data so that benchmarking data can be safely sent over a network.

Figure 1:
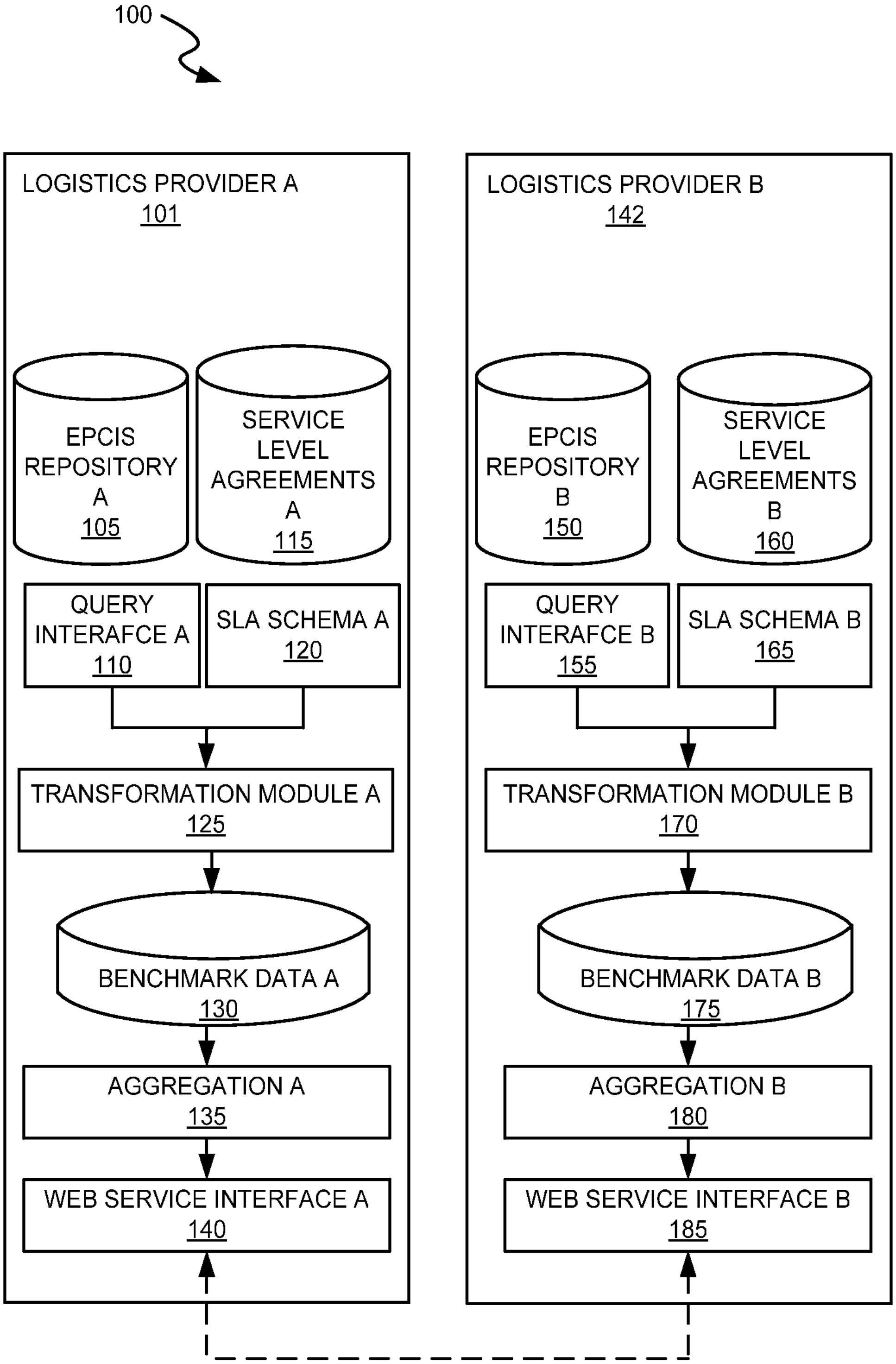
FIG. 1 is a block diagram of a system of an embodiment of the invention for exchanging benchmarking data between two stakeholders in a supply chain.

FIG. 1 is a block diagram of a system of an embodiment of the invention for exchanging benchmarking data between two stakeholders in a supply chain. Referring to FIG. 1, there are two stakeholders in a supply chain that represent a part of a larger supply chain, Logistic Provider A 101 and Logistics Provider B 142. Each logistics provider is responsible for performing certain tasks so that a good moves along the supply chain. Each logistics provider (e.g. "carrier") implements an infrastructure to monitor the movement of goods and the events related to the movement of goods. Logistics Provider A 101 records event data about goods in an Electronic Product Code Information Services (EPCIS) repository A 105 and stores Service Level Agreements (SLA) in an SLA repository A 115. Logistics Provider B 142 records event data in an EPCIS repository B 150 and stores SLAs in an SLA repository B 160. As stakeholders in the supply chain, logistics provider A 101 and logistics provider B 142 need to be able to exchange data about their operations so that the parts of the supply chain they are responsible for function correctly. Logistics Provider A 101 employs transformation module A 125 to extract SLA data from the SLA repository A 115 and translates the data using the SLA Schema A 120. Based on the extracted data, the transformation module A 125 sends a query to the EPCIS repository 105 using the query interface A 110. Using the data from the SLA repository A 115, the transformation module obtains only the data pertaining to a certain SLA from the EPCIS repository A 105. The EPCIS repository A 105 may contain event data about many goods that logistics provider A 101 is responsible for. As a company providing logistics services, logistics provider A 101 can participate in many supply chains. That is why, it is important for logistics provider A 101 to be able to estimate if diverse levels of service are met. Thus, logistics provider A 101 should be able to benchmark event data from the EPCIS repository 105 to a concrete SLA. For example, logistics provider A 101 may need to estimate if the level of service desired between itself and logistics provider B 142 about a particular good is met. In such a case, the transformation module A 125 obtains event data from the EPCIS repository A as required by the SLA signed by both logistics provider A 101 and logistics provider B 142. When the transformation module A 125 has obtained the data from the query interface A 110, the transformation module A 125 maps the data from the query to the data from the SLA. With such a mapping, it is possible to estimate if the actual data recorded in the EPCIS repository A 105 matches the desired data as requested in the concrete SLA from the SLA repository A 115. In other words, the transformation module A 125 produces benchmark data A 130. The benchmark data A 130 enables the logistics provider A 101 to estimate if it performs according to the level of service desired in the concrete SLA. The benchmark data A 130 can be used by the logistics provider A 101 internally to measure and improve the level of service of the company, for example, by the operations department that takes care of operations across the company. Alternatively, the benchmark data A 130 can be used to measure and improve the level of service of the whole supply chain. The benchmark data A 130 can serve as a benchmark of the performance of the particular section of the supply chain and can be exchanged with other participants in the supply chain. As all stakeholders in the supply chain are different companies, there are also security restrictions and confidentiality issues concerning data exchange. The logistics provider A 101 employs the aggregation module A 135. The aggregation module A 135 is responsible to estimate if any additional data is required to be aggregated on top of the benchmark data A 130. For example, if the benchmark data A 130 will be exchanged with logistics provider B 142, the aggregation module A 135 will aggregate security data on top of the benchmark data A 130. To send the compiled data to logistics provider B 142, logistics provider A 101 initiates web service interface A 140. Web service interface A 140 connects to web service interface B 185 and web service interface B 185 accepts the data on behalf of logistics provider B 142. Within the everyday operations of the supply chain that logistics provider A 101 and logistics provider B 142 participate in, both logistics providers need to exchange diverse evaluation data about many goods in many shipments. Logistics provider B 142 records event data in the EPCIS repository B 150 and maintains SLAs in the SLA repository B 160. To benchmark event data from the EPCIS repository B 150 to data from the SLA repository B 160, the logistics provider B 142 employs the transformation module B 170. The transformation module B 170 retrieves an SLA form the SLA repository B 160 and translates the requirements contained within the SLA using the SLA Schema B 165. Based on the translated data, the transformation module B 170 sends a query to the EPCIS repository B 150 using the query interface B 155. Having obtained the event data from the query interface B 155, the transformation module B 170 maps the event data to the translated data from the SLA. Thus, the transformation module B 170 produces benchmark data B 175. If the logistics provider B 142 will send the benchmark data B 175 over a network, the transformation module B 170 sends the benchmark data B 175 to aggregation module B 180. The aggregation module B 180 aggregates security data as necessary on top of the benchmark data B 175 and initiates the web interface B 185 to send the compiled data over a network to other participants in the supply chain, such as the logistics provider A 101.

The benchmark data obtained by the system 100 of FIG. 1 can also be used for other purposes beside the use case described above. From the standpoint of international business it is often necessary to select transportation service providers (e.g. "carriers") that are new to a supply chain. Benchmark data can serve as a universal measure of compliance to levels of service, and thus, to the quality of service provided by a transportation service provider. In a selection process, many carriers can compete with each other and offer a similar service. The carriers save benchmark data for later reference, and in a carrier selection process, the stakeholders in a supply chain can require benchmark data to compare the service offers of many carriers. If a certain carrier has a history of benchmark data showing full compliance to levels of service, it can be estimated that this carrier is more likely to perform according to desired levels of service and thus it will be safer to select that carrier. This effectively decreases the business risks associated with selecting a new provider of a service in a supply chain. Further, if transportation service providers are aware that benchmark data is saved, monitored, and distributed among prospective clients, transportation service providers will have more incentive to provide better levels of service. Thus, compliant benchmark data can serve as a rating system of competing carriers. As an additional benefit, benchmark data can be used in the negotiation of service level agreements. For example, if it is estimated that the desired parameters in an SLA have not been met over time, it may be beneficial for a future SLA to be negotiated with adjusted parameters so that there are more realistic levels of service in the future.

Figure 2:
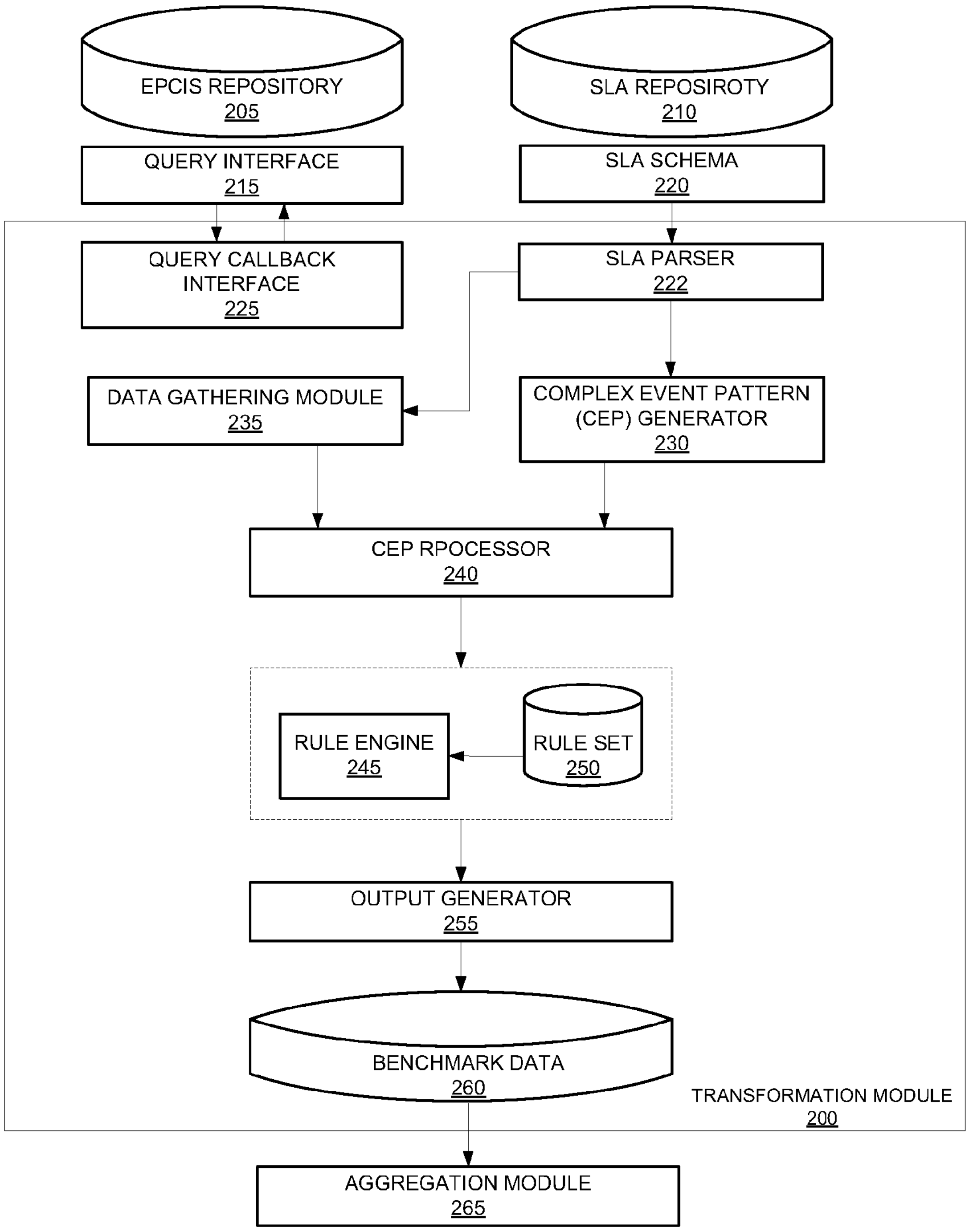
FIG. 2 is a block diagram of an embodiment of the invention for transforming data from an EPCIS repository and an SLA repository into meaningful benchmarking data.

FIG. 2 is a block diagram of a transformation module to transform EPCIS event data and SLA data into benchmark data according to an embodiment of the invention. Referring to FIG. 2, a Complex Event Pattern (CEP) generator 230 retrieves data from an SLA repository 210. In one embodiment, data is stored in the SLA repository 210 in eXtensible Markup Language (XML) format. The CEP generator 230 uses an SLA Parser 222 to extract data from the SLA repository 210. The SLA Parser 222 parses the data from the SLA repository 210 using the SLA schema 220 to translate SLA data. The CEP generator 230 receives the extracted data and generates Complex Event Patterns (CEPs). Using the extracted data, the CEP generator 230 generates patterns specifying concrete conditions. For example, if an SLA requires that a good should be at a location X at time Y and the quantity of the good should be Z, the CEP generator 230 generates an expression to specify the pattern required in the SLA. Then, the CEP generator 230 sends the completed pattern to a CEP processor 240 for analysis. A data gathering module 235 is responsible to obtain event data from an EPCIS repository 205. The data gathering module 235 receives SLA data from the SLA repository 210. Using the data extracted by the SLA Parser 222, the data gathering module 235 translates parameters supplied in the SLA in XML format data into a query for the EPCIS repository 205 and sends the query to a query interface 215. Via the query interface 215, relevant information can be extracted from the EPCIS repository 205 which is then returned in the form of a data stream to the data gathering module 235 via the query callback interface 225. The data gathering module 235 extracts the event data from the data stream and sends the event data to the CEP processor 240. Thus, the CEP processor 240 obtains two inputs to analyze and produce benchmark data. The CEP processor 240 maps the event data obtained from the data gathering module 235 to the pattern obtained from the CEP generator 230. If the mappings are correct, the CEP processor 240 can estimate that the actual event data recorded in the EPCIS repository 205 corresponds to the desired level of service specified in the SLA obtained from the SLA repository 210. If the mappings do not match correctly, the CEP processor initiates a rule engine 245. The rule engine retrieves a rule from a rule set 250. A rule is a set of instructions to analyze precisely the difference between desired parameters in an SLA and actual event data. The rule engine 245 analyses the data received from the CEP processor 240 and produces detailed results. For example, the rule engine 245 can estimate what is the difference between a desired parameter in the SLA and the actual recorded event data. After the detailed analysis, the rule engine 245 transfers the data to an output generator 255. The output generator 255 compiles the data mapped by the CEP processor 240 into a native XML format recognized across transformation modules in stakeholders in a supply chain so that all stakeholders in the supply chain can exchange and understand the data. Thus, the output generator 255 produces benchmark data 260. If the benchmark data will be sent over a network, an aggregation module 265 aggregates security data on top of the benchmark data 260.

Figure 3:
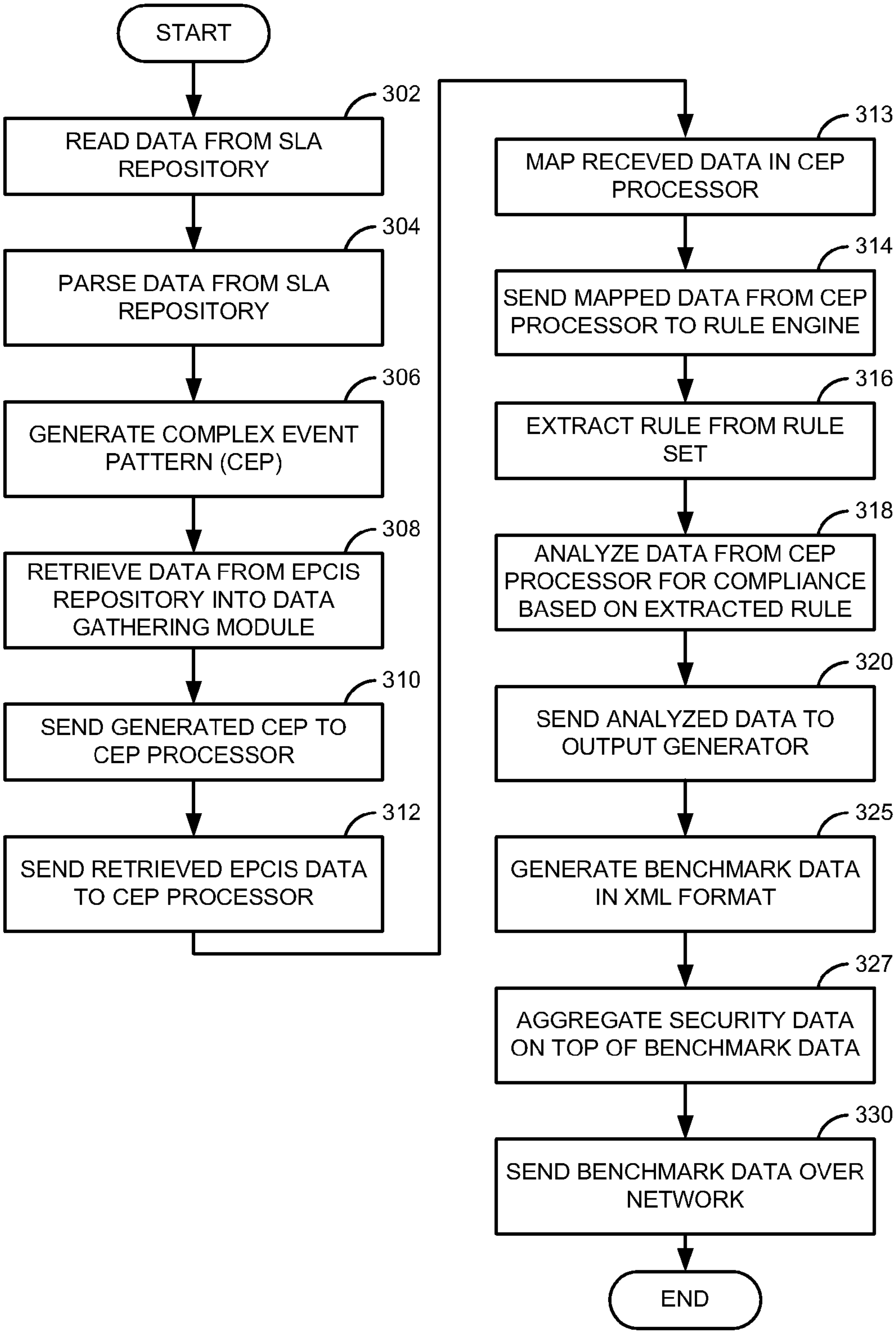
FIG. 3 is a flow diagram of an embodiment of the invention for transforming data from an EPCIS repository and an SLA repository into meaningful benchmarking data.

FIG. 3 is a flow diagram of an embodiment of the invention for producing benchmark data in a supply chain. Referring to FIG. 3, at process block 302, data is read from an SLA repository. At process block 304, the data read from the SLA repository is parsed. At process block 306, a CEP is generated based on the parsed data. The generated CEP specifies the requirements of the SLA data in an expression. At process block 308, data is retrieved from an EPCIS repository. At process block 310, the generated CEP is sent to a CEP processor. At process block 312, the data retrieved from the EPCIS repository is sent to the CEP processor. Having received the two inputs, the CEP processor maps the data retrieved from the EPCIS repository to the CEP pattern at process block 313. At process block 314, the mapped data is sent to a rule engine. At process block 316, a rule is extracted from a rule set. At process block 318, the received mapped data is analyzed according to the extracted rule. At process block 320, the analyzed data is sent to an output generator. At process block 325, the output generator generates the benchmark data in native XML format. At process block 327, security data is aggregated to the benchmark data in XML format. At process block 330, the aggregated benchmark data in XML format is sent over a network to one or more stakeholders in a supply chain.

In an embodiment of the invention, the process as described in FIG. 3 is performed by components as described in FIG. 2. Referring to FIGS. 2 and 3, at process block 302, data is read from the SLA repository 210. At process block 304, the data read from the SLA repository 210 is parsed using the SLA parser 222. At process block 306, the CEP generator 230 generates a CEP based on the parsed data. The generated CEP specifies the requirements of the SLA data in an expression. At process block 308, the data gathering module 235 creates a query for the EPCIS repository 205 based on the parsed SLA data, sends it to the query interface 215 and waits for the results of the query. When the query is complete, the response is received via the query callback interface 225 in the form of a data stream at the data gathering module 235. At process block 310, the CEP generator sends the generated CEP to the CEP processor 240. At process block 312, the data gathering module 235 sends the data retrieved from the EPCIS repository 205 to the CEP processor 240. Having received the two inputs, the CEP processor 240 maps the data retrieved from the EPCIS repository 205 to the CEP pattern received from the CEP generator 230 at process block 313. At process block 314, the CEP processor 240 sends the mapped data to the rule engine 245. At process block 316, a rule is extracted from the rule set 250. At process block 318, the rule engine 245 analyses the received mapped data according to the extracted rule. At process block 320, the rule engine 245 sends the analyzed data to the output generator 255. At process block 325, the output generator generates the benchmark data 260 in native XML format. When the completed benchmark data 260 is available, the aggregation module 265 aggregates security data on top of the benchmark data 260, at process block 327. At process block 330, the aggregated benchmark data 260 is sent over a network.

In an exemplary embodiment of the invention, the components as described in FIG. 2 generate benchmark data for exchange between two service providers. When an SLA is established between the two service providers, the SLA is placed in the SLA repository 210. To place the SLA in the SLA repository 210, the SLA is validated against the SLA schema 220. The SLA schema 220 reflects estimated constructs and parameter-value pairs, for example:

Thresholds: delivery time less than or equal to 3 hours
Explicit values: expected weight of shipment=350 g
Variable for dynamic values (instantiated during runtime): 3 hours after time of successful quality check in distribution center
Valid value domains: measured temperature values may not fall below 8 degrees and may not exceed 12 degrees
Negation: not . . . .
Dependencies (regarding time and space): if . . . then
Conjunctions, disjunctions: . . . and . . . and . . . or
Validity periods: between 9 and 12 o'clock; deliveries from Belfast to Cologne The SLA is validated against the SLA schema 220 and placed in the SLA repository 210 using the following statements:

setSLA(slaDocument: XML)
getSLAByShipmentOrder (id: int): XML
getSLAByServiceProvider (id: int): XMLList
validate (SLA: XML): boolean After the statements above are executed, the SLA repository 210 holds the following data in XML representation:

```
<sla id="436">
<shippingOrder >3456567</ shippingOrder>
<shipmentEPC> urn : epc : gid –28:700.155</ shipmentEPC >
<parameters>
. . .
<parameter name = " time o f delivery">
<op>lessequal</op>
<value >2008-12-14T12 : 30:00Z </value>
</parameter>
. . .
</parameters>
</sla>
```

The SLA Parser 222 parses documents using the following statements to extract SLA data for service providers and orders. To extract SLA data for a particular order, the SLA parser 222 uses the statement below with the order ID as a parameter:

parse (orderID: int): boolean

To extract SLA data for a particular service provider, the SLA parser 222 uses the statement below with the provider ID as a parameter:

parse (providerID: int): Boolean

The SLA parser 222 parses the SLA document and extracts parameters and their values identifying EPCIS event data sets, for example:

ShippingOrder—BizTransaction
Shipment EPC—EPC in EPCList
Contract Validity Time (time window)—respective eventTimes
Specific routes (from A to B)—bizLocation The SLA parser 222 sends the extracted data to the data gathering module 235 and the CEP generator 230. The data gathering module 235 invokes an extractData( ) method to obtain the data from the SLA parser 222 and use the data to generate a query for the EPCIS repository 205:

extractData (params: SLAParameterSet: void

Using the data contained in the SLAParameter set, the data gathering module 235 generates for example the following query to the EPCIS repository 205:

```
poll ( queryName="SimpleEventQuery " ,
params={ eventType={"ObjectEvent "} ,
GE eventTime="2008-11-01T00 : 00:00Z" ,
LTeventTime="2008-12-14T00 : 00:00Z" ,
EQbizTransaction shippingOrde r = "45.573" ,
MATCH epc="urn : epc : gid –28:700.[150 -200] ._"})
```

The data gathering module 235 sends the generated query to the query interface 215. The response to the query is sent to the query callback interface 225 using the following statements to return all events from the EPCIS repository 205 that match the query:

```
callbackResults(resultData:QueryResults):void
callbackResults(resultData={" eventList"})
```

The EPCIS repository 205 contains event data in XML format, for example, the statements below record data for a goods receipt event:

```
<ObjectEvent>
<eventTime>2008-07-17T17:56:12</eventTime>
<recordTime>2008-07-17T17:58:04</recordTime>
<epcList>
<epc>urn:epc:id:sscc:100.201.502</epc>
<epc>urn:epc:id:sscc:100.201.503</epc>
</epcList>
<action>OBSERVE</action>
<bizStep>urn:epcglobal:epcis:bizstep:fmcg:unpacking</bizStep>
<disposition>urn:epcglobal:epcis:bizstep:
fmcg:readytobeprocessed</disposition>
<readPoint><id>urn:epc:id:sgln:4028132.00002.0</id></readPoint>
<bizLocation><id>urn:epcglobal:loc:
0614141073467.A23-49</id></bizLocatio>
<bizTransactionList>
<bizTransactiontype="urn:epcglobal:examplegmbh:shipping-order">
Example-GmbH-shipping-order-number-478</bizTransaction>
</bizTransactionList>
</ObjectEvent>
```

The EPCIS event data that matches the query is received at the data gathering module 235 in the form of a data stream. The data gathering module 235 transforms the data so that the CEP processor 240 can interpret the data against a CEP generated by the CEP generator 230. The CEP generator 230 receives data from the SLA parser 222 and generates a CEP for the CEP processor 240 using the following statement:

generate(params: SLAParameterMap):boolean

The SLAParameterMap supplied to the generate method contains the SLA parameters extracted from the SLA by the SLA parser 222. Using the SLAParameterMap, the CEP generator 230 generates for example the following CEP:

```
var$epc
var$locationA,$locationB
```

-continued

```
var$eventTime1,$eventTime2
var$maximumTimeOfDelivery
readEvent1(EPC($epc),readPoint("goodsissue"),location($locationA))
followedby
readEvent2(EPC($epc),readPoint("goodsreceipt"),location($locationB))
with
condition($eventTime2-$eventTime1<=$maximumTimeOfDelivery)
```

The CEP processor 240 matches the data received by the data gathering module 235 against the CEP generated by the CEP generator 230 and generates a log file with the results, for example: "pickup location:ok, time of delivery:failed". If the entries in the log file satisfy the conditions specified in the SLA, the data received from the data gathering module 235 and the CEP generator 230 is sent to the output generator 255 to generate benchmark data in XML format. If CEP processor 240 estimates that the data received from the data gathering module 235 do not match the requirements of the SLA, the CEP processor 240 may first send the two inputs received from the data gathering module 235 and the CEP generator 230 to the rule engine 245 or additional processing. The rule engine 245 retrieves a rule from the rule set 250 to use for the processing:

```
if(not(exists((event1.epcList.contains($epc)and
event1.bizLocation='locationA'and
event1.readPoint='goodsissue')and
(event2.epcList.contains($epc)and
event2.bizLocation='location2'and
event2.readPoint='goodsreceipt')))and
not(exists(event3.epcList.contains($epc)and
event3.action='delete'and
event1.eventTime<event3.eventTime<event2.eventTime)))
then trigger alert
```

The rule engine performs the processing as specified in the rule and sends the output to the output generator 255. The output generator 255 arranges the received data in a logical order (i.e. data from the EPCIS repository 205 is linked to data from the SLA repository 210) to produce meaningful benchmark data in XML format that can be exchanged between the two service providers. Using the following statement, the output generator 255 queues data received from the CEP processor 240 for transformation in XML:

queue(data:PatternMatchingResult):void

Using the following statement, the output generator 255 queues data received from the rule engine 245 for transformation in XML:

queue(data:RuleEvaluationResult):void

After the data is queued, the generation of an XML document representing benchmark data is triggered:

initiateMarshalling(id:int):Boolean

Finally, benchmark data 260 is produced about the given order ID as required by the SLA parser 222 above. The benchmark data 260 is generated in XML format, for example:

```
<evaluationdata>
<shippingOrder>3456567</shippingOrder>
<serviceProvider>769.134</serviceProvider>
<shipmentEPC>urn:epc:gid-28:700.155</shipmentEPC>
<slaParameter>...</slaParameter>
...
<slaParameter name = "timeofdelivery">
```

-continued

```
<expected op = "lessequal">2008-12-14T12:30:00Z</expected>
<observed>2008-12-14T13:12:54Z</observed>
<!-positivevaluesindicatedelays-->
<difference>00:42:15</difference>
</slaParameter>
...
<slaParameter>...</slaParameter>
</evaluationdata>
```

The generated XML benchmark data 260 may be stored for later use or exchanged between the two service providers to estimate if the service providers provide the expected level of service.

Figure 4:
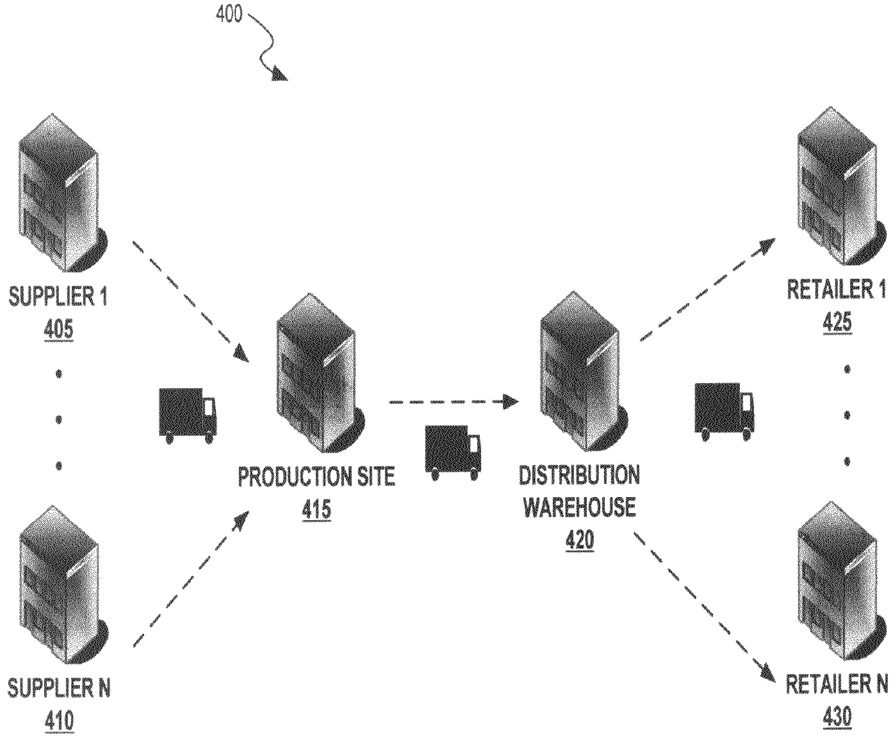
FIG. 4 is a block diagram of a supply chain exchanging benchmark data according to an embodiment of the invention.

In another embodiment of the invention, benchmark data is used to continuously monitor the level of service in a supply chain transporting temperature-sensitive goods such as foods or raw materials that can only be stored at certain temperatures. FIG. 4 is a block diagram of a supply chain 400. The supply chain 400 has a number of stakeholders. Supplier 1 405 through Supplier N 410 supply raw materials to a production site 415. The production site 415 produces temperature-sensitive goods and supplies the goods to a distribution warehouse 420. The distribution warehouse 420 supplies the goods to retailer 1 425 through to retailer N 430. Starting from supplier 1 405 raw materials are tagged with an RFID tag containing an EPC that identifies the object (good) uniquely. Each of the stakeholders employs an EPCIS repository on its premises to record EPCIS event data about the movement of goods along the supply chain. Also there is an SLA in place between each of the stakeholders. As the supply chain is concerned with the movement of goods that are sensitive to temperature, an SLA specifies the desired time, quantity, and quality of the good. Most importantly, the parameter specifying the quality of the good specifies that the good needs to be kept at a certain temperature at all times. While in other supply chains certain parameters in the SLA may be negligible, for example, it may be accepted that a stakeholder may deviate from the desired level of service by a certain percentage, in supply chain 400, the level of service must be observed precisely because if the good is not kept at the precise temperature as specified in the SLA, the good will be thoroughly damaged and unusable. This means that the good will not be sold by the retailers and thus a deviation of the desired level of service leads to losses close to 100% because suppliers, manufacturer, and warehouse have fulfilled their obligations according to the contract but since the retailers cannot sell the good, there is no return on the investment. The supplier 1 405 records EPCIS event data about the movement of goods while the good is still at its own premises and after it leaves the premises, until it reaches the production site 415. Simultaneously, the production site 415 monitors the progress of the good while in transit, especially monitoring the temperature. In other words, the production site 415 continuously requests benchmark data and expects to receive 100% compliant benchmark data. Similarly, after the manufactured product leaves the production site 415, both the production site 415 and the distribution warehouse 420 continuously require and expect to receive 100% compliant benchmark data. If the distribution warehouse 420 receives the good with overall 100% compliant benchmark data, it can be estimated that the good is of the expected quality and it is safe to proceed with sending the good to the retailers. Again, while the good is in transit, the retailers constantly monitor the computed benchmark data so that once the good is received at the premises of the retailers it can be estimated that the good is of the expected quality and can safely be sold to end customers. Thus, when the benchmark data is closely monitored throughout the supply chain, risks of damages can be identified as early as possible and losses can be mitigated so that the overall performance of the supply chain is improved.

Elements of embodiments of the invention described herein may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computing system to enable exchange of benchmark data between two service providers, the system comprising:
- a processor; and
- a memory, the memory having stored thereon executable instructions related to:
  - a data gathering module to retrieve Electronic Product Code Information Services (EPCIS) event data from an EPCIS repository based on parameters extracted from Service Level Agreement (SLA) data;
  - a complex event pattern (CEP) generator to generate a CEP based on the SLA data;
  - a CEP processor to receive information from the data gathering module and the CEP generator, and to map the EPCIS event data to the generated CEP;
  - a rule set to maintain rules about mapping of the SLA data to the EPCIS event data;
  - a rule engine to receive mapped data from the CEP processor and analyze the mapped data for compliance based on a rule from the rule set;
  - an output generator to receive the mapped data from the CEP processor and to generate the benchmark data; and
  - an aggregation module to:
    - retrieve confidentiality requirements governing exchange of information between the two service providers; and
    - add security data to the benchmark data according to the retrieved confidentiality requirements.

2. The system of claim 1, further comprising:
- a query interface to enable communication between the data gathering module and the EPCIS repository;
- a query callback interface to receive data from the query interface; and
- an SLA parser module to parse the SLA data.

3. The system of claim 1, further comprising a web service interface to enable the exchange of benchmark data between the two service providers over a computer network.

4. A computer-implemented method for enabling exchange of benchmark data between two service providers, including at least one processor for executing program code, the method comprising:
- generating a complex event pattern (CEP) based on Service Level Agreement (SLA) data;
- retrieving event data from an Electronic Product Code Information Services (EPCIS) event data repository;
- mapping the generated CEP to retrieved event data and generating mapped data;
- retrieving a rule from a rule set, the rule specifying compliance requirements;
- receiving the mapped data into a rule engine;
- analyzing, using the at least one processor, the mapped data for compliance based on the requirements specified in the rule;
- generating the benchmark data from the mapped data;
- retrieving confidentiality requirements governing exchange of information between the two service providers; and
- adding security data to the benchmark data according to the retrieved confidentiality requirements.

5. The method of claim 4, wherein generating the CEP comprises:
- retrieving the SLA data from an SLA repository;
- parsing the SLA data; and
- creating the CEP based on the parsed SLA data.

6. The method of claim 4, wherein retrieving the event data from the EPCIS event data repository comprises:
- retrieving the SLA data from an SLA repository;
- parsing the SLA data; and
- constructing a query to the EPCIS event data repository based on parameters from the parsed SLA data.

7. The method of claim 4, wherein mapping the generated CEP to the retrieved event data comprises connecting the retrieved event data to parameters in the SLA data.

8. The method of claim 4, wherein generating the benchmark data comprises generating an XML output based on the mapped data.

9. The method of claim 4, further comprising exchanging the benchmark data between the two service providers over a network.

10. The method of claim 9, wherein exchanging the benchmark data comprises:
- invoking a web service interface to send the benchmark data over the network.

11. A non-transitory machine readable medium having instructions therein for enabling exchange of benchmark data between two service providers that when the instructions are executed by the machine, cause the machine to:
- generate a complex event pattern (CEP) based on Service Level Agreement (SLA) data;
- retrieve event data from an Electronic Product Code Information Services (EPCIS) event data repository;
- map the generated CEP to retrieved event data and generate mapped data;
- retrieve a rule from a rule set, the rule specifying compliance requirements;
- receive the mapped data into a rule engine;
- analyze the mapped data for compliance based on the requirements specified in the rule;
- generate the benchmark data from the mapped data;
- retrieve confidentiality requirements governing exchange of information between the two service providers; and add security data to the benchmark data according to the retrieved confidentiality requirements.

12. The machine-readable medium of claim 11, wherein the instructions causing the machine to generate the CEP, cause the machine to:

retrieve the SLA data from an SLA repository;

parse the SLA data; and create the CEP based on the parsed SLA data.

13. The machine-readable medium of claim 11, wherein the instructions causing the machine to retrieve the event data from the EPCIS event data repository, cause the machine to:

retrieve the SLA data from an SLA repository;

parse the SLA data; and construct a query to the EPCIS event data repository based on parameters from the parsed SLA data.

14. The machine-readable medium of claim 11, wherein the instructions causing the machine to map the generated CEP to the retrieved event data comprise instructions causing the machine to connect the retrieved event data to parameters in the SLA data.

15. The machine-readable medium of claim 11, wherein the instructions causing the machine to generate the benchmark data comprise instructions causing the machine to generate an XML output based on the mapped data.

16. The machine-readable medium of claim 11, further comprising instructions that cause the machine to exchange the benchmark data over a network.

17. The machine-readable medium of claim 16, wherein the instructions causing the machine to exchange the benchmark data, cause the machine to:

invoke a web service interface to send the benchmark data over the network.

* * * * *